United States Patent
Chen

(10) Patent No.: US 9,503,146 B1
(45) Date of Patent: Nov. 22, 2016

(54) WATERPROOF DEVICE FOR CELLPHONES

(71) Applicant: C J HOUSING CO., LTD., New Taipei (TW)

(72) Inventor: Ying-Fong Chen, New Taipei (TW)

(73) Assignee: C J HOUSING CO., LTD., New Taipei (TW)

( * ) Notice: Subject to any disclaimer, the term of this patent is extended or adjusted under 35 U.S.C. 154(b) by 0 days.

(21) Appl. No.: 14/918,980

(22) Filed: Oct. 21, 2015

(51) Int. Cl.
| H04M 1/00 | (2006.01) |
| H04B 1/3883 | (2015.01) |
| H04B 1/3888 | (2015.01) |
| H04M 1/18 | (2006.01) |
| H04B 1/38 | (2015.01) |
| A45C 13/00 | (2006.01) |

(52) U.S. Cl.
CPC .......... *H04B 1/3883* (2013.01); *H04B 1/3888* (2013.01); *H04M 1/18* (2013.01); *A45C 13/008* (2013.01); *H04B 2001/3894* (2013.01)

(58) Field of Classification Search
CPC ............... H04B 1/3888; H04B 2001/3894; H04M 1/18; A45C 13/008; A45C 2011/002
USPC ...................................... 455/575.8
See application file for complete search history.

(56) References Cited

U.S. PATENT DOCUMENTS

| 7,613,386 | B2 * | 11/2009 | Shimamura | G03B 17/08 206/316.2 |
| 7,907,394 | B2 * | 3/2011 | Richardson | G06F 1/1613 312/223.1 |
| 8,344,277 | B1 * | 1/2013 | Bloch | H01H 13/06 200/302.2 |
| D691,969 | S * | 10/2013 | Chu | D13/164 |
| 9,170,690 | B2 * | 10/2015 | Chu | G03B 17/08 |
| 2010/0298025 | A1 * | 11/2010 | Spence | H04M 1/18 455/550.1 |
| 2012/0262618 | A1 * | 10/2012 | Weakly | A45C 11/00 348/333.01 |
| 2013/0082963 | A1 * | 4/2013 | Chu | G03B 17/08 345/173 |
| 2013/0193006 | A1 * | 8/2013 | Bergreen | A45C 11/22 206/37 |
| 2013/0334071 | A1 * | 12/2013 | Carnevali | H05K 5/03 206/37 |
| 2014/0268519 | A1 * | 9/2014 | Huang | H04B 1/3888 361/679.01 |

* cited by examiner

*Primary Examiner* — Duc M Nguyen
(74) *Attorney, Agent, or Firm* — Muncy, Geissler, Olds & Lowe, P.C.

(57) ABSTRACT

A waterproof device for cellphones comprises a lower case and an upper case pivotally fitted at the lower case. The lower case has a grip section protruding from the underside, an accommodating space inside the lower case for loading of a smart phone device, and a transparent material region located at the underside and corresponding to the lens of the smart phone device wherein the accommodating space is designed to accommodate a power supply module at another side for charging the smart phone device. Moreover, the upper case is penetrated by at least a pressing component which faces the accommodating space in the lower case and has one end above the upper case and the other end over the touch panel of the smart phone device. When the upper case is securely coupled with the lower case for development of an airtight space between the upper case and the lower case, a diver can manipulate the waterproof device for cellphones to take up underwater photography by tapping one end of the pressing component on a control panel and making the other end contact the smart phone device for controlled photography in water.

10 Claims, 10 Drawing Sheets

WATERPROOF DEVICE FOR CELLPHONES

BACKGROUND OF THE INVENTION

1. Field of the Invention

The present disclosure relates to a waterproof device for cellphones, particularly a waterproof device for cellphones used in underwater photography.

2. Descriptions of the Related Art

Currently, a variety of functions in smart phones such as wireless Internet, photography, sound recording, satellite positioning, real-time information sharing and music broadcast provide unlimited life convenience to users, particularly the camera function in smart phones used in taking pictures of figures and beautiful scenery.

In addition, modern people pay more attentions to leisure activities at mountains or seas, for example, mountain climbing, cycling, rafting, diving and snorkeling, for physical and mental stress relief. In this regard, many people who love marine leisure activities including diving and snorkeling explore the beautiful underwater world, watching various coral reefs and fishes freely cruising therein, and satisfying themselves with beautiful scenery on pictures taken in diving and snorkeling. However, it will be convenient for the amateurs of diving and snorkeling to take up underwater photography with smart phones directly rather than expensive professional underwater photographic equipment.

Therefore, the manufacturers produced and sold universal waterproof bags wherein a universal waterproof bag with a pocket in which a smart phone is held can be sealed with a pocket mouth clipped for no penetration of water and watertight effect. The universal waterproof bag, however, still has drawbacks as follows:

(1) The waterproof bag carried by a diver suffers higher hydraulic pressures in deeper water which squeeze the waterproof bag to tightly adhere to a smart phone's surface because of no buffer space between the waterproof bag and the smart phone and even damage the smart phone in the case of excessive hydraulic pressures squeezing the smart phone itself;

(2) The waterproof bag, which is manufactured for general purposes rather than cellphones particularly, may be capacious but clumsy and impractical because it does not match dimensions of a cellphone in specifications and must be larger than a mobile phone;

(3) A touch panel on a smart phone which is held but not securely fixed in the waterproof bag may be tapped incorrectly for activation of an unnecessary function;

(4) Electric energy in a smart phone is wasted excessively or even exhausted early in underwater photography or video recording which is still ongoing in virtue of no power supplied to the smart phone in the waterproof bag.

Against this background, a waterproof device for cellphones as an optimal solution should be designed for marine activities such as diving and snorkeling in a certain depth, applicable to various smart phones with distinct specifications, and internally provided with a power supply module by which a smart phone can be charged in water.

SUMMARY OF THE INVENTION

The present disclosure relates to a waterproof device for cellphones by which a mobile phone is used in underwater photography.

To this end, the waterproof device for cellphones comprises: a lower case which has a grip section protruding from the underside, at least a mounting hole at a peripheral side, an accommodating space inside the lower case for loading of at least a smart phone device with a lens and a touch panel, and a transparent material region located at the underside and corresponding to the lens of the smart phone device wherein the accommodating space is designed to accommodate a power supply module at another side for charging the smart phone device; an upper case which is pivotally fitted at the lower case, provided with a fixed part opposite to and inserted into the mounting hole on the lower case for secure integration of the upper case and the lower case and development of an airtight space between the upper case and the lower case, and further penetrated by at least a pressing component having one end above the upper case and the other end over the touch panel of the smart phone device for controlled photography with one end of the pressing component pressed and the other end contacting the touch panel of the smart phone device.

Specifically, the lower case is equipped with at least a shock-absorbing stopper inside the accommodating space and with a changeable location for accommodating a smart phone device with a distinct size in the accommodating space of the lower case.

Specifically, the power supply module comprises a charge cable extending therefrom and connected to and charging the smart phone device.

Specifically, the lower case comprises a positioning port next to the accommodating space and covered with a photographic panel on which a peephole lining up with the lens of the smart phone device is opened.

Specifically, the photographic panel on which a fiber-optic connecting hole is opened comprises a fiber-optic cable groove designed on an inner side wherein the fiber-optic cable groove linking the fiber-optic connecting hole accommodates a fiber-optic cable which penetrates the fiber-optic connecting hole, links an external flashlight device, transmits a signal to the external flashlight device, and enables the external flashlight device to flash when detecting light.

Specifically, the lower case is provided with a gasket at an edge surface of the lower case and covered with the upper case at the edge surface wherein the upper case is securely coupled with the lower case through the fixed part for development of an airtight space between the upper case and the lower case by means of the gasket at the edge surface of the lower case.

Specifically, the lower case is provided with a filter-holder connection end which is located at the bottom, adjacent to the peephole and connected with a filter unit that comprises at least a telescopic arm and at least a filter moved in the front of the peephole.

Specifically, the fixed part on the upper case comprises a fixed toggle section from which a fixed holding section extends wherein the fixed holding section penetrating the upper case is inserted into the mounting hole on the lower case, which is covered with the upper case, and further fastened in the mounting hole for secure connection of the upper case and the lower case with the fixed toggle section switched.

Specifically, the lower case comprises a tripod hole at a peripheral side.

Specifically, the lower case is provided with at least a fastener hole portion at a peripheral side.

DETAILED DESCRIPTION OF THE PREFERRED EMBODIMENTS

The technical contents, features and effects related to a waterproof device for cellphones are clearly presented in preferred embodiments and accompanying drawings.

Figure 1A:
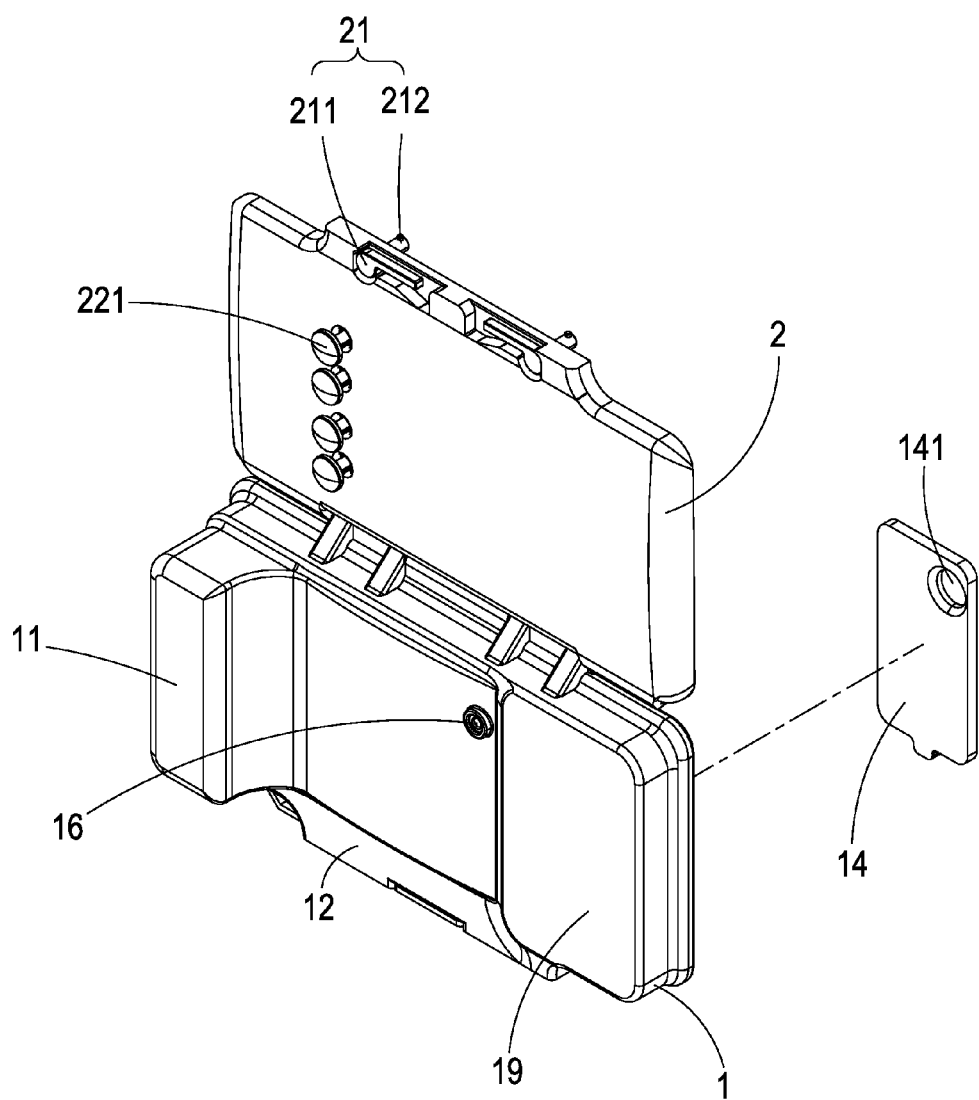
FIG. 1A is a structural schematic view of a disassembled waterproof device for cellphones
Figure 1B:
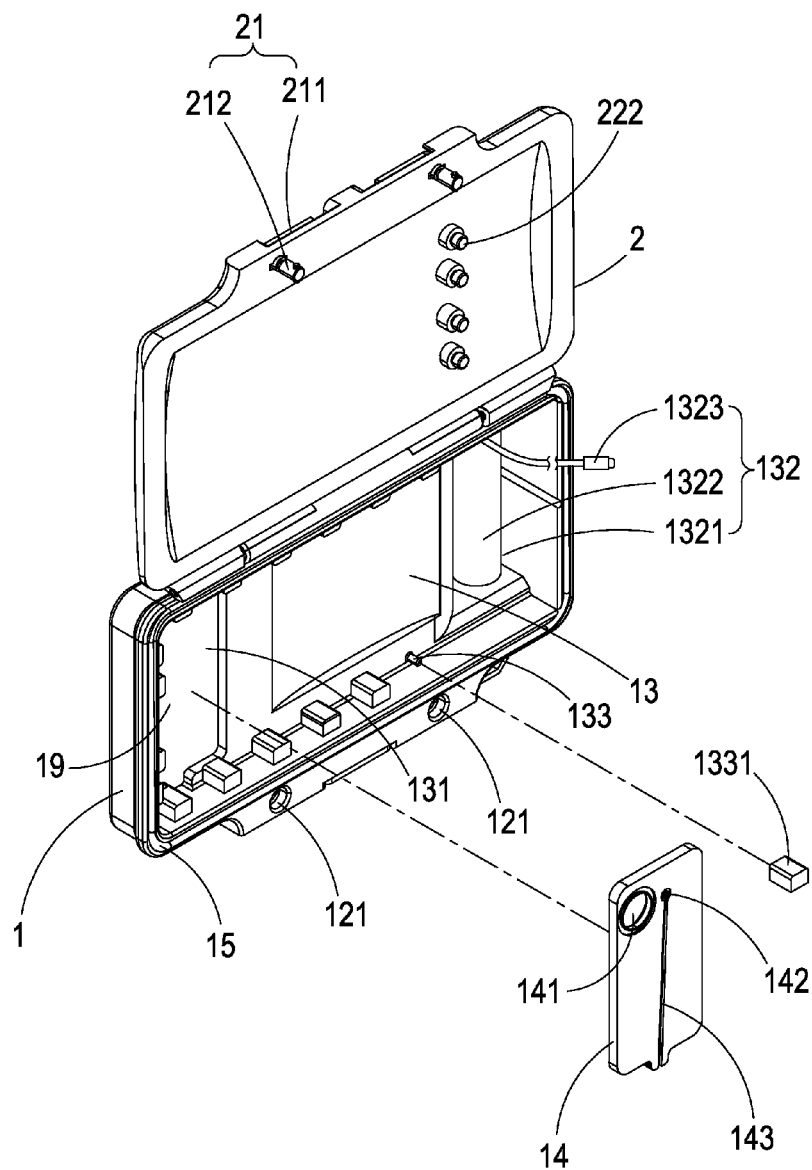
FIG. 1B is another structural schematic view of a disassembled waterproof device for cellphones.
Figure 2:
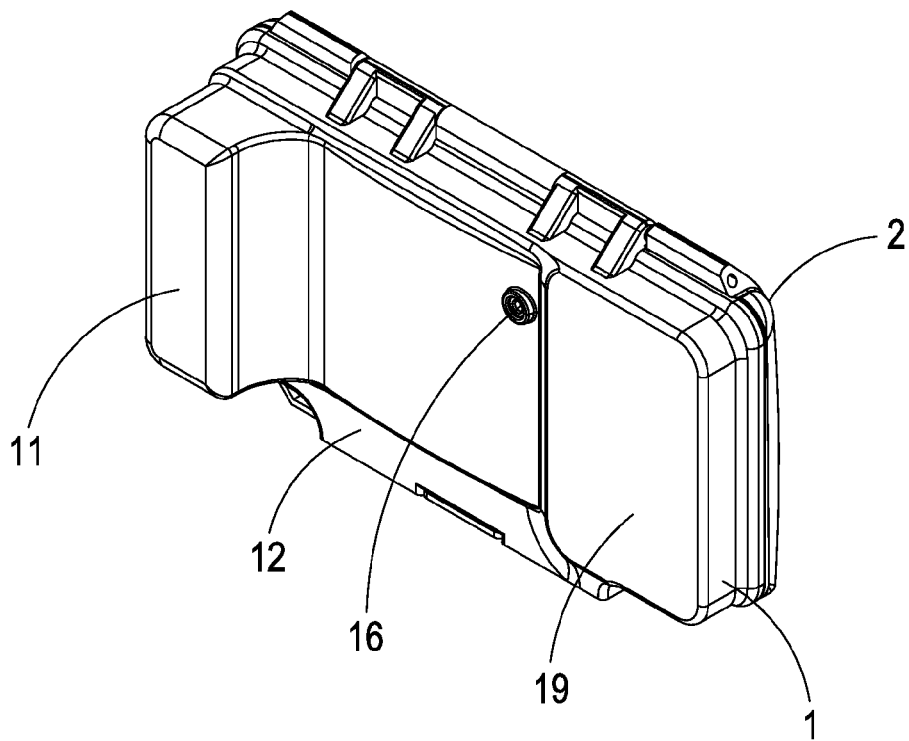
FIG. 2 is a structural schematic view of an assembled waterproof device for cellphones.
Figure 3:
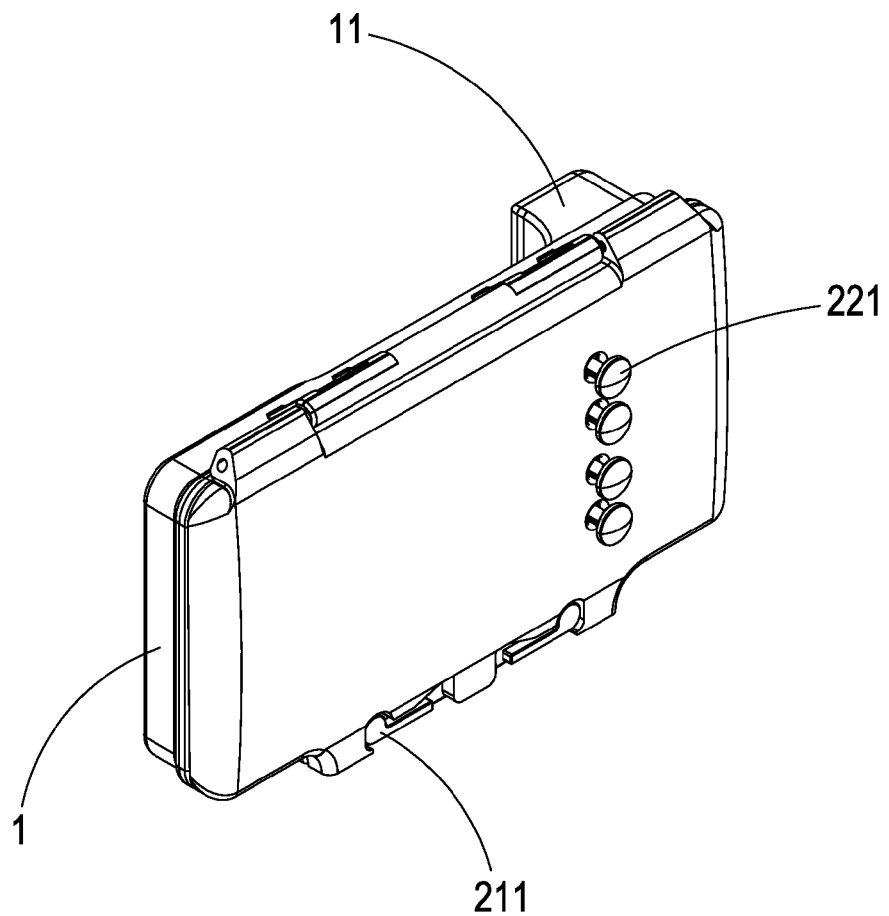
FIG. 3 is a structural schematic view of an assembled waterproof device for cellphones from the other side.

Referring to FIG. 1, FIG. 2 and FIG. 3, which are a structural schematic view of a disassembled waterproof device for cellphones, a structural schematic view of an assembled waterproof device for cellphones, and a structural schematic view of an assembled waterproof device for cellphones from the other side, respectively. As shown in FIG. 1 to FIG. 3, the waterproof device for cellphones comprises a lower case 1 and an upper case 2 wherein the lower case 1 comprises a grip section 11 protruding from the underside, a retaining bracket 12 designed at a peripheral side and having two mounting holes 121, an accommodating space 13 inside the lower case 1 for loading of a smart phone device 3 with a lens 31, a touch panel 32 and a flashlight 33, a transparent material region 19 at the underside, and a positioning port 131 opposite to the transparent material region 19, next to the accommodating space 13 and covered with a photographic panel 14 on which a peephole 141 (lining up with the lens 31 of the smart phone device 3) is opened.

Moreover, the retaining bracket 12 comprises a tripod hole 122 to which a tripod or another photographic equipment is connected and further at least a fastener hole portion 18 along an edge of the lower case 1 for fastening a camera strap, photographic equipment or a floating ball increasing buoyancy of the waterproof device for cellphones in water.

Furthermore, the photographic panel 14 comprises a fiber-optic connecting hole 142 and a fiber-optic cable groove 143 which links the fiber-optic connecting hole 142 for loading of a fiber-optic cable 144 penetrating the fiber-optic connecting hole 142 and passing the fiber-optic cable groove 143; the photographic panel 14 links a fiber-optic port 10 with a transparent plane thereon by which a signal from the fiber-optic cable 144 is connected and transmitted to an external flashlight device through the fiber-optic port 10 and enables the external flashlight device to flash when the fiber-optic cable 144 detects light. To take pictures, the flashlight 33 on the smart phone device 3 must be activated. However, illumination from the activated flashlight 33 is insufficient because the lens 31 on the smart phone device 3 lines up with the peephole 141 alone. Thus, with an external flashlight device installed, the fiber-optic cable 144 must be connected to the external flashlight device first, which will be activated to flash and overcome a situation of light insufficient when the fiber-optic cable 144 detects light.

Figure 8:
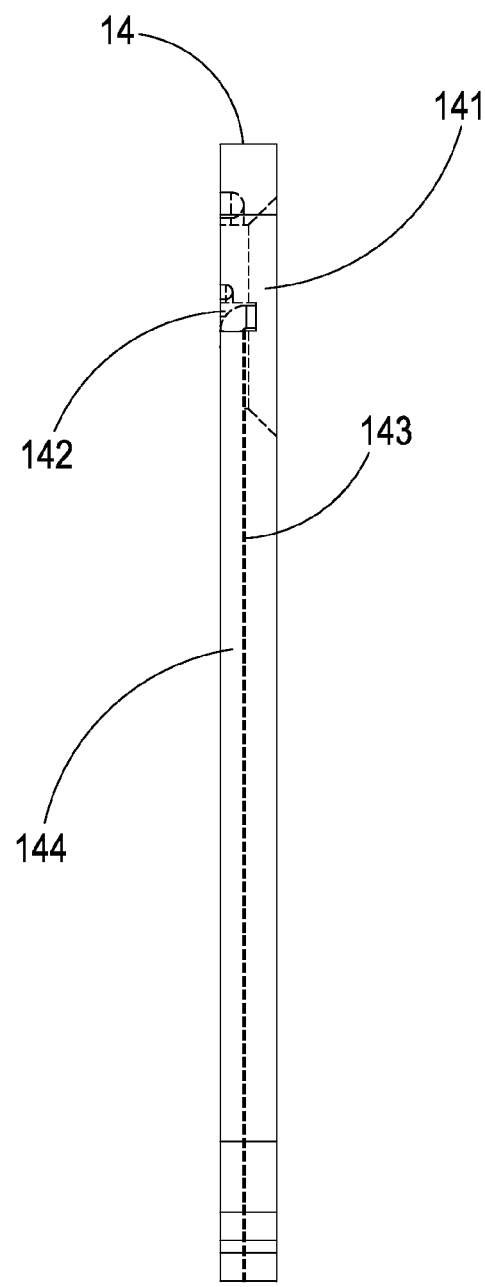
FIG. 8 is a schematic view which illustrates a layout of fiber optics in a waterproof device for cellphones.

As shown in FIG. 8, the fiber-optic cable 144, which is bent 45 degrees at the fiber-optic connecting hole 142, makes a path of light rays for receiving light from the flashlight 33 and transmitting the light downward via the fiber-optic port 10. As such, the fiber-optic cable 144, which detects light from the flashlight 33 on the smart phone device 3, transmits a signal downward to the external flashlight device outside the fiber-optic port 10 and enables the external flashlight device to flash for sufficient illumination.

In the accommodating space 13, a power supply module 132 mounted at another side and used to charge the smart phone device 3 comprises a circuit board (not shown in the figures), a power supply component (a battery 1322 with a battery case 1321 integrated in the embodiment) and at least a charge cable 1323: the power supply component and one end of the charge cable 1323 are electrically connected to the circuit board; the power supply module 132 charges the smart phone device 3 when the other end of the charge cable 1323 is connected to a charger connector of the smart phone device 3.

The upper case 2 which is pivotally fitted at the lower case 1 comprises a pivotal side which corresponds to and links another pivotal side of the lower case 1 (neither gaps nor spaces between the two pivotal sides for no injury to a user's fingers during closing or opening of the upper case 2 and the lower case 1 as shown in the figures); the upper case 2 is provided with a fixed part 21 being opposite to the mounting hole 121 on the lower case 1 and having a fixed toggle section 211 from which a fixed holding section 212 extends; the fixed holding section 212 penetrating the upper case 2 is inserted into the mounting hole 121 on the lower case 1, which is covered with the upper case 2, and securely fastened in the mounting hole 121 for secure connection of the upper case 2 and the lower case 1 with the fixed toggle section 211 switched.

As shown in the figures, two protrudent parts on the fixed holding section 212 are just fastened in the mounting hole 121 when the fixed toggle section 211 is switched; moreover, a gasket 15 on an edge surface of the lower case 1 attributes to development of an airtight space between the upper case 2 and the lower case 1 when the upper case 2 covered on the edge surface of the lower case 1 is securely coupled with the lower case 1 through the fixed part 21.

Figure 5:
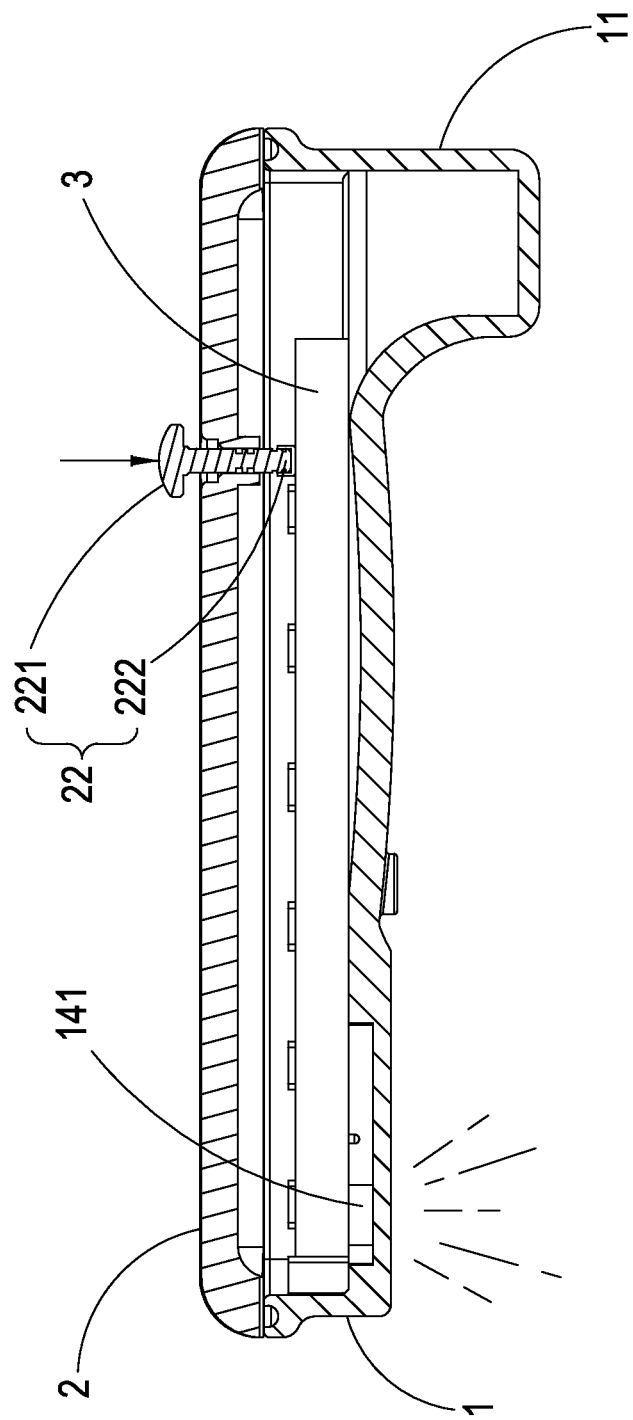
FIG. 5 is a schematic view which illustrates a pressing component on a waterproof device for cellphones is pressed for taking a picture.

Moreover, at least a pressing component 22 penetrating and installed on the upper case 2 has a top 221 above the upper case 2 and a bottom 222 penetrating the upper case 2 and staying over the touch panel 32 of the smart phone device 3; the pressing component 22, which is not fixed on the upper case 2 but flexibly moved up and down in a certain range when penetrating the upper case 2, is equipped with a stopper at the bottom 222 by which the pressing component 22 is not totally removed from the penetrated upper case 2, as shown in FIG. 5. When the pressing component 22 positioned at the top 221 is pressed, the bottom 222 contacts the touch panel 32 of the smart phone device 3 for controlled photography.

Figure 4A:
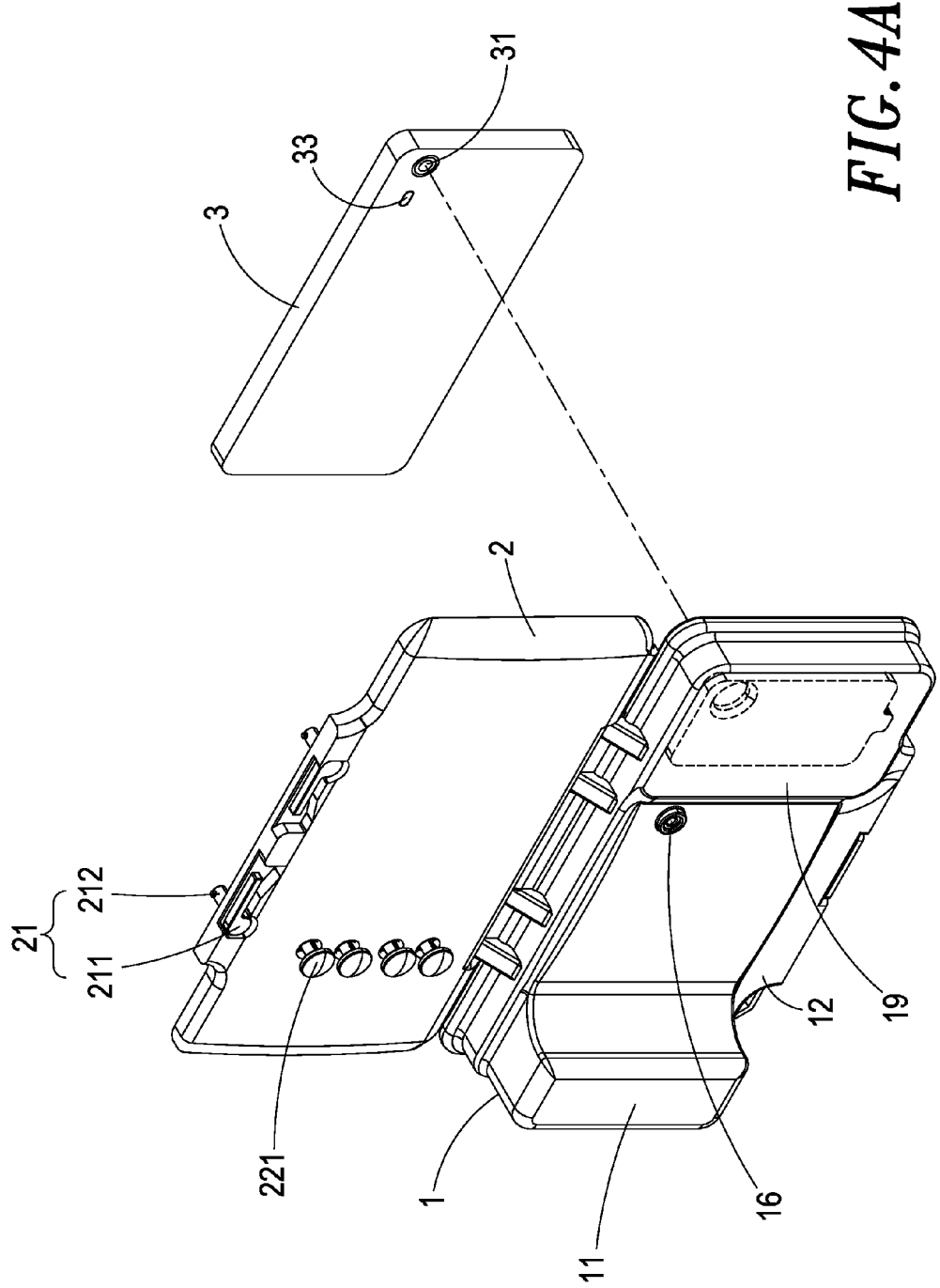
FIG. 4A is a schematic view which illustrates a waterproof device for cellphones is integrated with a smart phone.
Figure 4B:
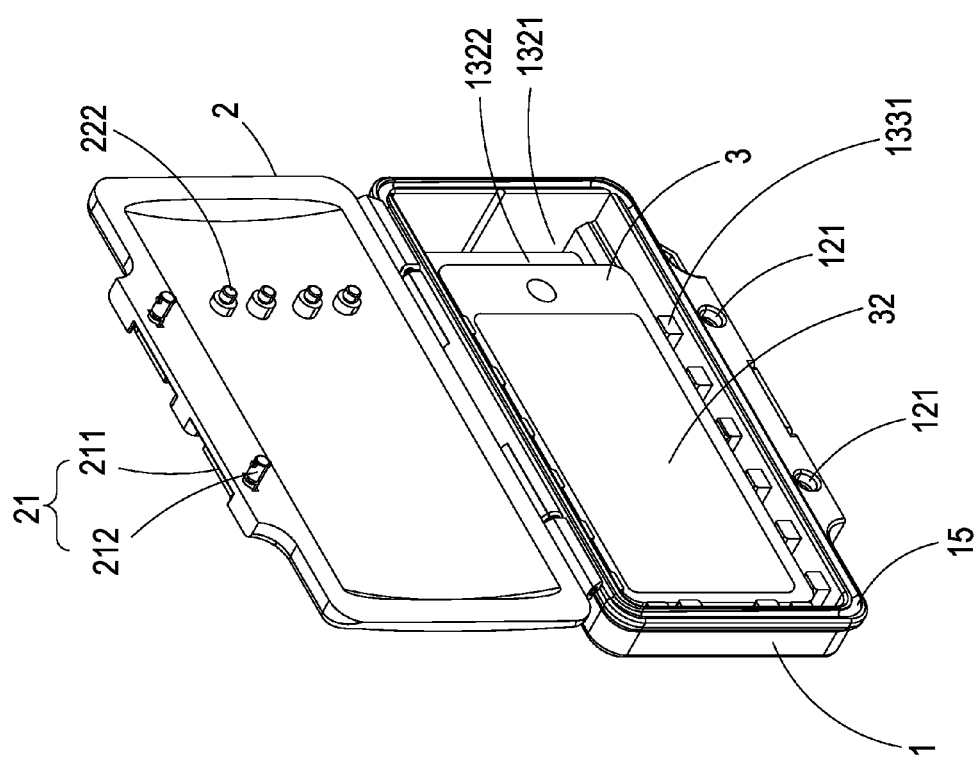
FIG. 4B is another schematic view which illustrates a waterproof device for cellphones is integrated with a smart phone.

As shown in FIGS. 4A and 4B for employment of a waterproof device for cellphones, the lens 31 of the smart phone device 3 should line up with the peephole 141; moreover, the photographic panel 14 which is removed flexibly (the peephole 141, the fiber-optic connecting hole 142 and the fiber-optic cable groove 143 are customized on the photographic panel 14 with their positions adjusted for a distinct smart phone device 3) can be replaced by a new one because of a unique position of the lens 31 on a distinct smart phone device 3.

With the upper case 2 and the lower case 1 securely integrated, the gasket 15 on the edge surface of the lower case 1 attributes to development of an airtight space between the upper case 2 and the lower case 1.

In addition, a control panel (not shown in the figures) additionally mounted on the upper case 2 faces the accommodating space 13 in the lower case 1 and allows at least a pressing component 22 to penetrate; the pressing component 22, which has one end on the control panel and the other end penetrating the control panel and staying over the smart phone device 3, is not securely fixed on the control panel but flexibly moved up and down in a certain range; the control panel fixed on the upper case 2 with screws is removable for replacement because the pressing component 22 on the control panel is designed on a unique position according to a distinct smart phone device 3.

Therefore, with the smart phone device 3 loaded into the accommodating space 13, the lens 31 of the smart phone device 3 should line up with the peephole 141. For a distinct smart phone device 3 which is flexibly held in the accommodating space 13, several shock-absorbing stoppers 1331 might be inserted into a fixed stud 133 on a wall of the accommodating space 13 inside the lower case 1 in addition to replacing a control panel as mentioned previously; the shock-absorbing stoppers 1331 between a wall of the accommodating space 13 and the smart phone device 3 which has been loaded into the accommodating space 13 are able to not only fix the smart phone device 3 but also help the accommodating space 13 to fit a distinct smart phone device 3 when the smart phone device 3 and the peephole 141, both of which are slightly unmatchable, are leveled with each other and the smart phone device 3 is securely held in the accommodating space 13 and followed by the shock-absorbing stoppers 1331 installed in place to fix the smart phone device 3. The shock-absorbing stoppers 1331, which are made of a plastic substance (for example, rubber cushion) for fixing the smart phone device 3, absorb vibrations for reduced shakes or displacements of the smart phone device 3.

Figure 6:
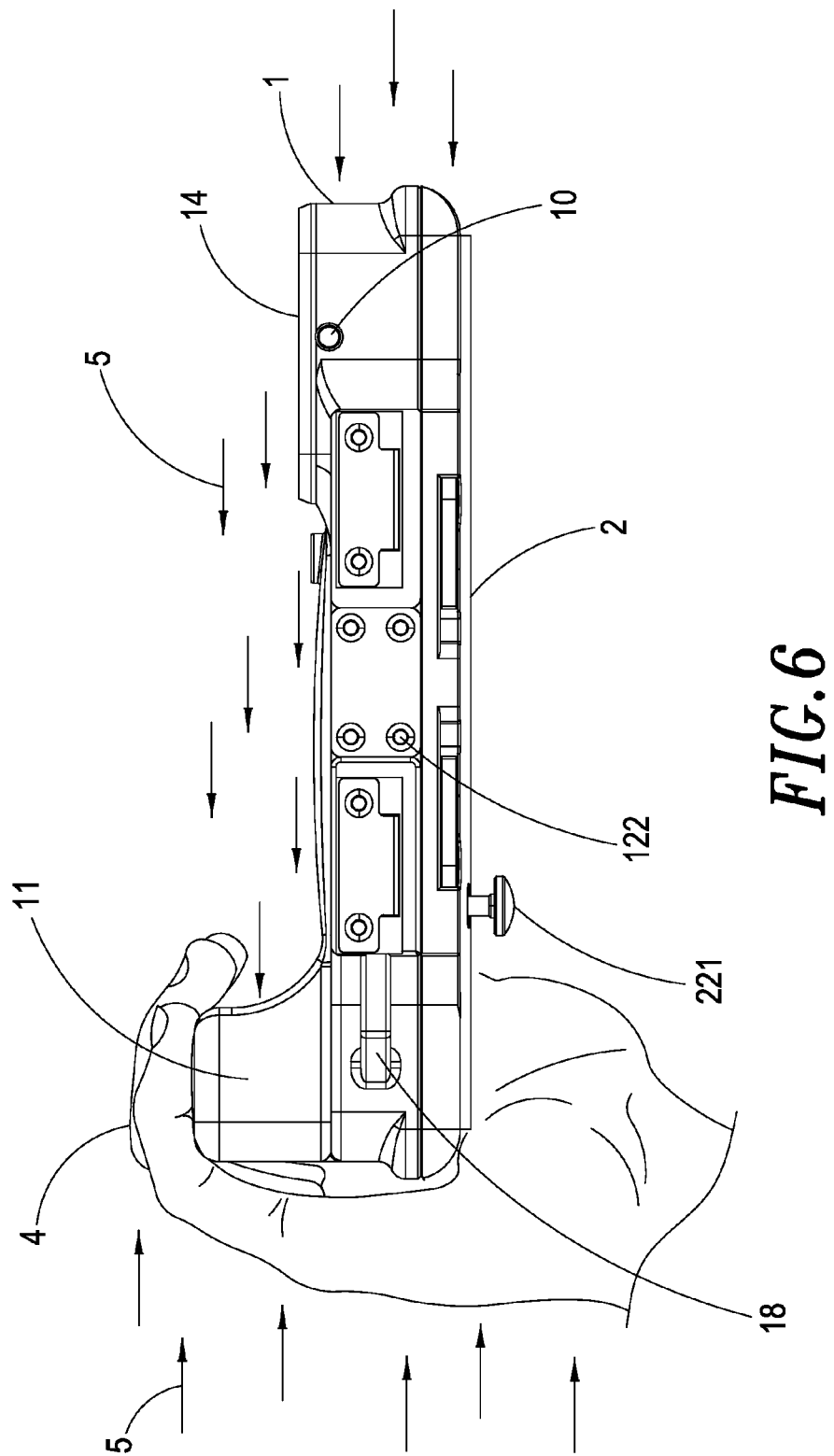
FIG. 6 is a schematic view which illustrates a waterproof device for cellphones is used in water.

Moreover, as shown in FIG. 6 (a bottom view of a waterproof device for cellphones), a user 4 holding the grip section 11 takes pictures underwater. In this case, leftward stream flow 5 and rightward stream flow 5 are blocked by the grip section 11 and both the hand of the user 4 as well as the grip section 11, respectively. As such, a waterproof device for cellphones is stabilized in water flow for neither shakes of the waterproof device for cellphones induced by the emergent stream flow 5 nor blurred images or photos due to slight shakes.

Figure 7:
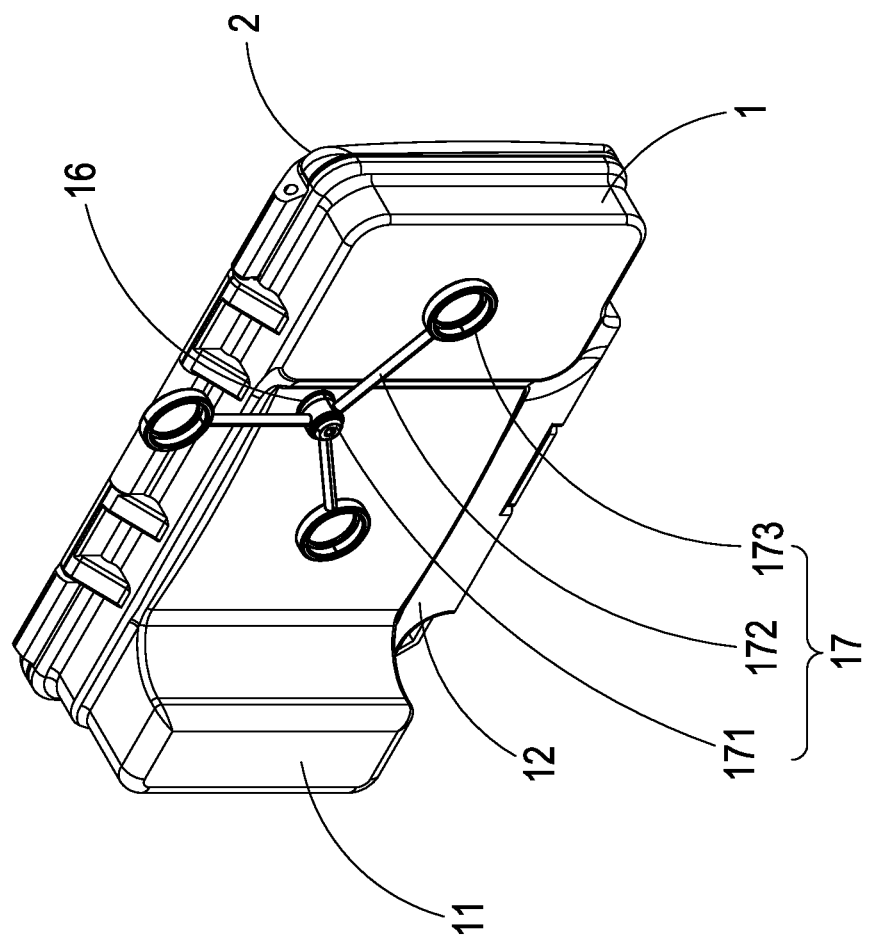
FIG. 7 is a structural schematic view of a waterproof device for cellphones in another embodiment.

Moreover, as shown in FIG. 7, a filter-holder connection end 16 is mounted on the bottom of the lower case 1, adjacent to the peephole 141 and further connected with a filter unit 17 which comprises a connecting end 171, at least three telescopic arms 172 and three filters 173. The connecting end 171 is internally equipped with a bearing by which the telescopic arms 172 rotate about the filter-holder connection end 16 and each of the filters 173 lines up with the peephole 141; a distinct filter 173 stays in the front of the peephole 141 with the corresponding telescopic arm 172, which falls short of a proper length originally, extended or retracted; the filter unit 17 can be a fish-eye lens.

In the present disclosure, a waterproof device for cellphones features following advantages compared with the conventional devices:

1. A waterproof device for cellphones embodies underwater photography of a smart phone in underwater activities including diving and snorkeling.
2. A waterproof device for cellphones particularly operated by a diver in a certain depth matches different smart phones with distinct specifications and is internally equipped with a power supply module for charging a smart phone simultaneously during underwater photography.
3. The preferred embodiments hereof should not be taken as examples to restrict the scope of a waterproof device for cellphones in the present disclosure. The partial changes and modifications made by the skilled persons who familiarizes themselves with the above technical features and embodiments without departing from the spirit and scope of the present disclosure should be covered in claims of the patent specification.

What is claimed is:

1. A waterproof device for cellphones, comprising:
a lower case which has a grip section protruding from the underside, at least a mounting hole at a peripheral side, an accommodating space inside the lower case for loading of at least a smart phone device with a lens and a touch panel, and a transparent material region located at the underside and corresponding to the lens of the smart phone device wherein the accommodating space is designed to accommodate a power supply module at another side for charging the smart phone device; and
an upper case which is pivotally fitted at the lower case, provided with a fixed part opposite to and inserted into the mounting hole on the lower case for secure integration of the upper case and the lower case and development of an airtight space between the upper case and the lower case, and further penetrated by at least a pressing component having one end above the upper case and the other end over the touch panel of the smart phone device for controlled photography with one end of the pressing component pressed and the other end contacting the touch panel of the smart phone device.

2. A waterproof device for cellphones as claimed in claim 1 wherein the lower case is equipped with at least a shock-absorbing stopper inside the accommodating space and with a changeable location for accommodating a smart phone device with a distinct size in the accommodating space of the lower case.

3. A waterproof device for cellphones as claimed in claim 1 wherein the power supply module comprises a charge cable extending therefrom and connected to and charging the smart phone device.

4. A waterproof device for cellphones as claimed in claim 1 wherein the lower case comprises a positioning port opposite to the transparent material region, next to the accommodating space, and covered with a photographic panel on which a peephole lining up with the lens of the smart phone device is opened.

5. A waterproof device for cellphones as claimed in claim 4 wherein the photographic panel comprises a fiber-optic cable groove designed on an inner side and connected to a fiber-optic connecting hole for accommodating a fiber-optic cable which penetrates the fiber-optic connecting hole, links an external flashlight device, transmits a signal to the external flashlight device, and enables the external flashlight device to flash when detecting light.

6. A waterproof device for cellphones as claimed in claim 1 wherein the lower case is provided with a gasket at an edge surface of the lower case and covered with the upper case at the edge surface for secure connection of the lower case and the upper case through the fixed part and development of an airtight space between the upper case and the lower case by means of the gasket at the edge surface of the lower case.

7. A waterproof device for cellphones as claimed in claim 1 wherein the lower case is provided with a filter-holder connection end which is located at the bottom, adjacent to the peephole, and connected with a filter unit that comprises at least a telescopic arm and at least a filter moved in the front of the peephole.

8. A waterproof device for cellphones as claimed in claim 1 wherein the fixed part on the upper case comprises a fixed toggle section from which a fixed holding section extends and the fixed holding section penetrating the upper case is inserted into the mounting hole on the lower case, which is covered with the upper case, and further fastened in the mounting hole for secure connection of the upper case and the lower case with the fixed toggle section switched.

9. A waterproof device for cellphones as claimed in claim 1 wherein the lower case comprises a tripod hole at a peripheral side.

10. A waterproof device for cellphones as claimed in claim 1 wherein the lower case is provided with at least a fastener hole portion at a peripheral side.

* * * * *